3,261,472
WATERWORKS FILTER
August Schneider, Marl, Germany, assignor to Chemische Werke Huls Aktiengesellschaft, Marl, Kreis Recklinghausen, Germany, a corporation of Germany
Filed Nov. 27, 1964, Ser. No. 414,278
Claims priority, application Germany, Aug. 4, 1961, C 24,799
1 Claim. (Cl. 210—274)

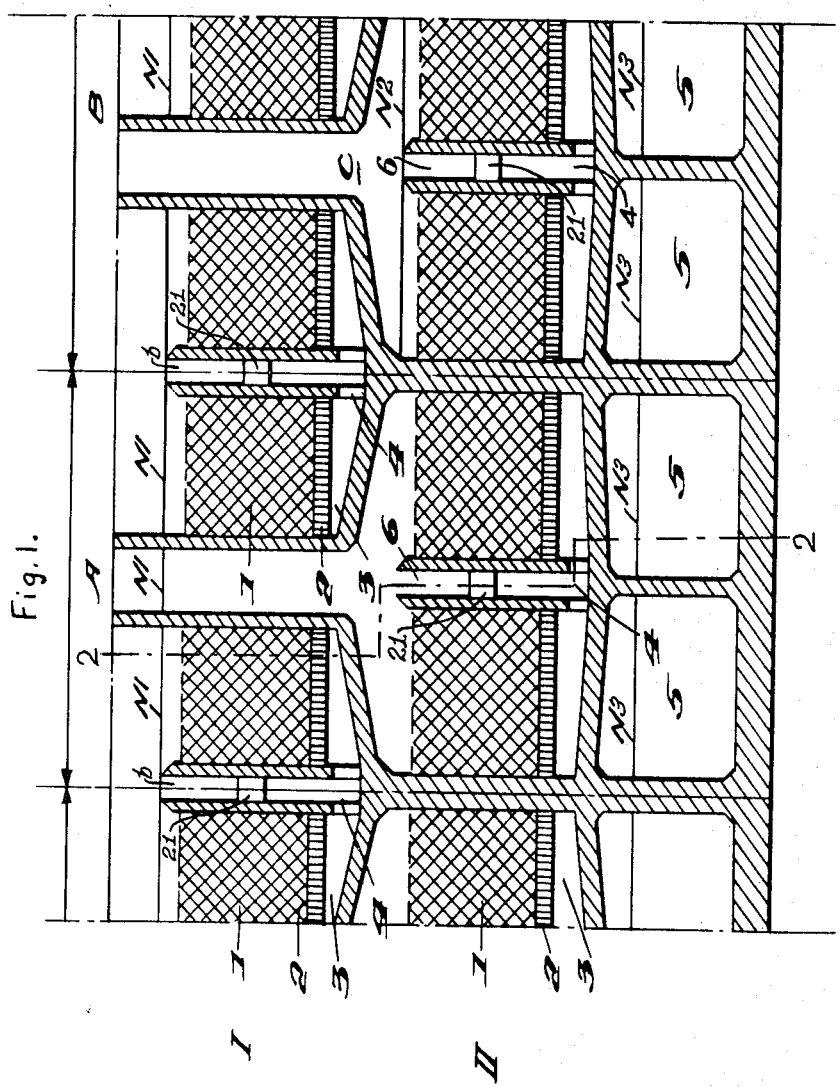

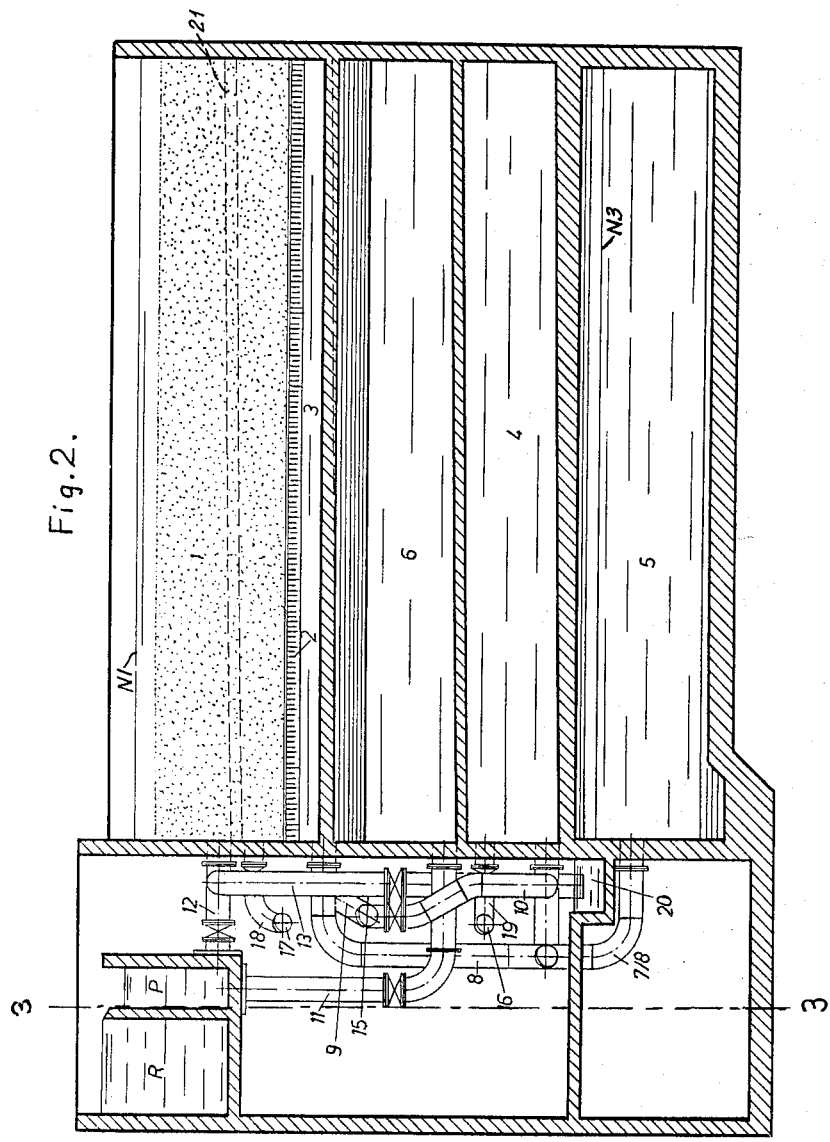

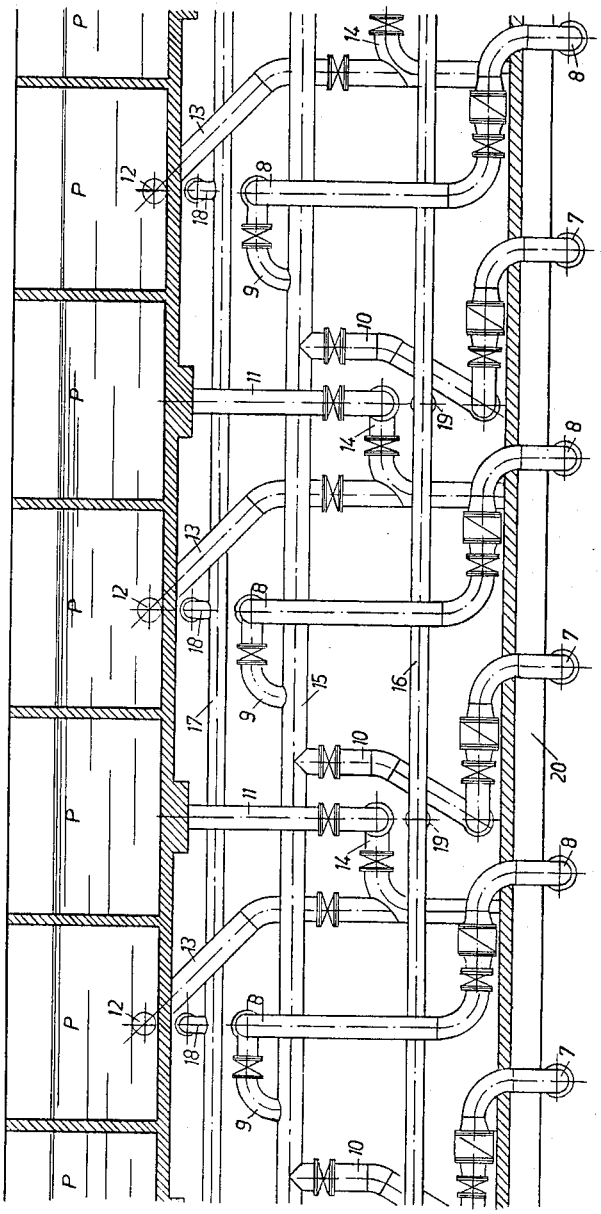

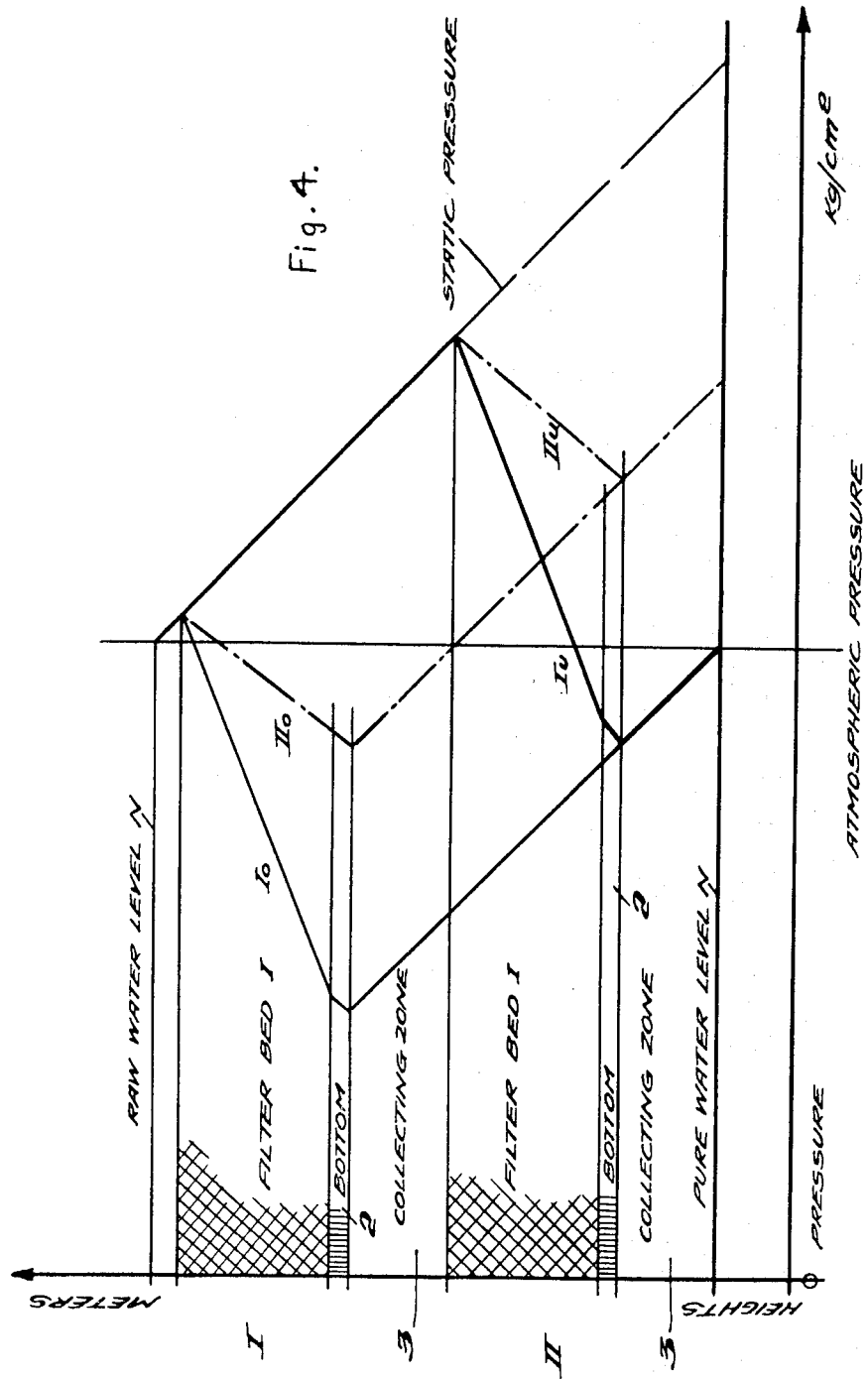

This application is a continuation-in-part of my application Ser. No. 208,036, filed July 6, 1962 and now abandoned.

To increase the throughput capacity of an open waterworks filter the crude water level above the filter is raised, that is, the filter is designed with excess head, to obtain the required pressure height. For this purpose the walls of the filter are extended upward, and the resulting space above the filter is filled with the crude water to be purified. This affords especially in the rinsing process a good control over the uniformity and efficiency of the filter area. The changing of the filter material and the removal of mud deposits likewise takes place in equally simple manner as in filters without excess head. A disadvantage however is that the greater water weight in the excess head space applies an extra load on the foundation and lower supporting elements of the filter, requiring a stronger construction of these parts.

It has now been found that this necessary reinforcement of the foundation can be utilized advantageously for increasing the capacity of the filter by enlargement of the filter area of the open waterworks filter operating with excess head, by equipping it with an open filter located in the excess head space and supported by the walls and foundation thereof.

As the head pressure required for the increase in throughput depends only on the height of head, i.e. on the hydrostatic pressure difference between the drain and the crude water level, but not on the head area, the head space, previously filled only by water, can according to the present invention be utilized by a filter area which is greater than that of the structural surface itself. When utilizing the residual height of head as pump feed height and when the crude water is very dirty (e.g. during floods), one can counter the shortened life of the filter by lowering the feed height. The easy visibility of the filter area, which is desirable especially during the rinsing process, and the possibility of unimpeded working at the filter bed and filter bottom, are retained. In the available end head space of the filter, accessory devices such as water inlet, distribution channel, and sieve drums, may be lodged with a saving of space and cost.

The mentioned advantages are obtained without or with only a slight extra weight on the structural body and ground and constitute a reduction of building costs per unit of filter area. Even if installations in the head space are heavier than the displaced water, it will as a rule be possible to absorb this without further reinforcement of the filter foundation, as the total load is necessarily distributed over a large area because of the design of the filter. In addition, by using the filter supporting structure, which is necessary anyway, also for the additional installations, a further reduction of the building cost as compared with separate mounting can as a rule be achieved.

The invention is illustrated in the accompanying drawings in which:
FIG. 1 is a vertical section of the filter,
FIG. 2 is a section on the line 2—2 of FIG. 1,
FIG. 3 is a section on the line 3—3 of FIG. 2, and
FIG. 4 is a pressure diagram.

In FIGURE 1 is shown the utilization of the head space by installation of an additional upper filter stage I above the lower filter stage II. In the filter section A, conditions during operation are illustrated. The water fed over a common crude water manifold R (see FIG. 2) by way of the distributing chambers P and the troughs 6 to the individual filters and maintained at level N1 passes through the filter beds 1 and filter bottoms 2 into the collecting zones 3 and discharge zones 4, in order thence to pass via respective lines with the necessary fittings (see FIGS. 2 and 3) into the clean water collecting basins 5, whence it is conducted to the consumers. N3 indicates the water level in the collecting basins 5. Troughs 6 are separated from the discharge zones 4 by the horizontal partitions 21. This basic filtering of the water is the same for both the upper and lower filters. With a design of the filters according to the invention it is thus possible independently of the filter size to enlarge the filter area 1.8 to 1.9-fold per filter section. The mutual spacing of the side walls of the upper filters must be such that a maintenance man can go through the space between the upper filters to the lower filters for work or observation. The same applies to the distance between upper edge of the lower rinsing trough 6 and lower edge of upper filter. In addition the lower filter bed must be easily observable, especially during rinsing. In filter section B the rinsing process of the lower filter is illustrated. The water level in section B is indicated by N2. From observation level C one has a good view of the filter area and of the filter rinsing process. To make this observation in simple manner the use of a mirror periscope with illumination is advantageous. The periscope can be introduced from above as needed, into the rinsing filter, which is free from crude water and permits the observation of the lower filter. From an observation platform the lower and upper filter area can be observed during operation. Any necessary work can be done at the lower filter bed in practically the same simple manner as before with open filters. For open water work filters it has hitherto been customary to let the water having passed through the filter bed run into the collecting basin below and thence to supply it to the pump. This method leaves part of the existing pressure height of the water unutilized.

Especially for the raised filters of the invention, where the height of the upper filters is great, it is economically desirable to collect the filtered water directly in a main and to conduct it to the pump. The natural pressure resulting from the height of head minus the filter and flow resistances then builds up in the main.

In FIGURE 4 is shown the pressure diagram of water passing through an upper and a lower filter as illustrated in FIGURE 1, practically the only resistances during full operation being caused by the filter bed and the filter bottom as is indicated. Starting from static pressure, beginning at the water surface N1 in section A of FIG. 1, the pressure curve $I_o$ will establish itself in the upper filter bed during unhindered passage and at the discharge into the clean water collecting basin at the water level N3. The pressure curve $I_u$ depicts the pressure conditions of the lower filter. By proper devices and method of operation provision must be made after the rinsing for creation and maintenance of the necessary vacuum. The maximum negative pressure in the curve $I_o$ establishes itself according to the level difference between the crude water level, the clean water level, and the level of the collecting zone and must be at a sufficient distance from the respective vapor pressure of the water to prevent boiling. Under ordinary conditions and with the resulting minimum level differences this is normally the case. Only when water of appreciably elevated temperature (hot industrial water) is being filtered, could there be an adverse factor here. If for industrial or other reasons the flow through the filter areas is to be made smaller than would establish itself with this design and with unhindered flow, there results a pressure loss as shown by curves $II_0$ and $II_u$. Thus there is still present an excess pressure, referred to the clean water level, which must be throttled when water is discharged to that point and the water level is exposed to atmospheric pressure. This pressure height however, can be utilized when the clean water collecting basin is under corresponding excess pressure or if the filters in separate suction lines are connected directly to a pump and the lines are thus utilized as inflow height to the pump. In the latter case the clean water collecting basin constitutes only a storage tank serving as reserve which may serve also to supply filter rinsing water as well as to receive the clean water during lowering and accumulation (before and after rinsing) of the crude water level. This period is suitable for letting the filtered water run into the storage tank, as there is not the same pressure height as in the filters in operation. As the water needed for rinsing is taken preferably from the storage tank, the rinsing water is thus replaced again. As customary, the water storage tank may also serve as water reserve in case of breakdown.

Details of the filter are shown in FIGS. 2 and 3. As appears from these figures untreated water overflows from a common duct or trough R into the distributing chambers P from which water is supplied through the pipes 12 and the upper troughs 6 to the upper filters and through the pipes 11 by way of the lower troughs 6 to the lower filters. Pipes 7 discharge purified water from the lower filters and pipes 8 discharge purified water from the upper filters. Pipes 9 supply washing water to the upper filters and pipes 10 supply washing water to the lower filters. Pipes 13 are for sediment discharge from the upper filters and pipes 14 are for sediment discharge from the lower filters. Pipe 15 is a main pipe line for supplying washing water to the filters through branch pipes 9 and 10. Pipes 16 and 17 are for supplying compressed air to the lower and upper filters respectively through the branch pipes 19 and 18 respectively. 20 is a main pipe for the discharge of sediment delivered thereto by the pipes 13 and 14.

During filtration illustrated in section A of FIG. 1 the untreated water flows from the main duct R into the individual chambers P which distribute it to the upper and lower filters by way of the pipes 11 and 12 and the troughs 6. The purified water is discharged through the filter bottoms 2 and flows to the purified water chambers 5 by way of the collecting zones 3, the discharge zones 4 and the pipes 7 and 8. During this filtration period the water level is maintained at the upper level indicated by the line N1 in section A.

During washing, illustrated in section B of FIG. 1, washing water is supplied through the main pipe 15 and is delivered through pipes 9 and 10 to the upper and lower zones 4. At the same time air is supplied to the zones 4 by way of the upper and lower main pipes 17 and 16 and branch pipe 18 and 19 and forces the water upwardly through the filter beds. The resulting sludge flows over the edges of the filters and by way of the troughs 6 and discharge pipes 13 and 14 to the main discharge pipe 20 whereupon the water level N1 is reestablished.

I claim:

An open water works filter comprising a plurality of lower filters arranged side by side, each lower filter comprising a filter bed, a bottom wall and side walls that extend a substantial distance above the filter bed, a plurality of upper filters arranged side by side above said lower filters, each upper filter comprising a filter bed, a bottom wall and side walls that are spaced apart from each other and from said lower filters permitting a person to enter from above and move downwardly between said upper filters to said lower filters, said upper filters being substantially wholly supported by said side walls of said lower filters, means for supplying water to be filtered to the top of each of said filter beds, a collecting basin for purified water below said lower filter beds, means for withdrawing purified water from below each of said filter beds and delivering it to said collecting basin, means for forcing flushing water and air upwardly through each of said filter beds and means for collecting and discharging wash water that overflows each of said filter beds.

References Cited by the Examiner
UNITED STATES PATENTS

| | | | |
|---|---|---|---|
| 632,466 | 9/1899 | Maignen | 210—284 |
| 1,088,929 | 3/1914 | Reisert | 210—284 |

REUBEN FRIEDMAN, *Primary Examiner.*

S. ZAHARNA, *Assistant Examiner.*